(12) United States Patent
Choe et al.

(10) Patent No.: US 8,614,746 B2
(45) Date of Patent: Dec. 24, 2013

(54) IMAGE PROCESSING APPARATUS AND METHOD OF NOISE REDUCTION

(75) Inventors: Won-hee Choe, Gyeongju-si (KR); Young-jin Yoo, Hwaseong-si (KR); Seong-deok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1129 days.

(21) Appl. No.: 12/563,904

(22) Filed: Sep. 21, 2009

(65) Prior Publication Data

US 2010/0085433 A1   Apr. 8, 2010

(30) Foreign Application Priority Data

Oct. 7, 2008   (KR) .................. 10-2008-0098347

(51) Int. Cl.
*H04N 5/33*   (2006.01)
(52) U.S. Cl.
USPC .......................................... 348/164; 382/260

(58) Field of Classification Search
USPC .................... 382/260–264; 348/164
See application file for complete search history.

(56) References Cited

U.S. PATENT DOCUMENTS

2007/0153335 A1*  7/2007  Hosaka .......................... 358/463
2008/0284880 A1*  11/2008  Numata ....................... 348/241

FOREIGN PATENT DOCUMENTS

| | | |
|---|---|---|
| JP | 2006-115147 | 4/2006 |
| JP | 2008-042780 | 2/2008 |
| KR | 100285817 | 1/2001 |

* cited by examiner

*Primary Examiner* — David Lazaro
(74) *Attorney, Agent, or Firm* — NSIP Law

(57) ABSTRACT

An image processing apparatus including an image acquiring unit to acquire a first image including color information and a second image having a spectral band wider than that of the first image and a noise reduction unit to extract edge information from the second image and to reduce noise of the first image based on the extracted edge information.

13 Claims, 3 Drawing Sheets

FIG.3

| | |
|---|---|
| R | G |
| B | W |

R: RED ENHANCER FILTER
G: GREEN ENHANCER FILTER
B: BLUE ENHANCER FILTER
W: MONO FILTER

FIG.4

| | |
|---|---|
| R | G |
| B | M |

R: RED ENHANCER FILTER
G: GREEN ENHANCER FILTER
B: BLUE ENHANCER FILTER
M: MAGENTA FILTER

IMAGE PROCESSING APPARATUS AND METHOD OF NOISE REDUCTION

CROSS-REFERENCE TO RELATED APPLICATION(S)

This application claims the benefit under 35 U.S.C. §119 (a) of Korean Patent Application No. 10-2008-0098347, filed Oct. 7, 2008, the disclosure of which is incorporated herein in its entirety by reference.

BACKGROUND

1. Field

The following description relates to an image processing apparatus and method of image noise reduction. More particularly, this description relates to high-performance noise reduction for photography technology.

2. Description of the Related Art

Image noise reduction is a general method of reducing image noise using one or more images of the same format from among images created by converting visible-band light into image signals. However, excessive noise may occur when highly sensitive photography (e.g., night-time monitoring photography, high-speed photography, etc.) adapted for indoor or night photography is not used in weak illuminant conditions. Excessive noise causes deterioration of picture quality. For this reason, a need for high-performance image noise reduction technology in photography exists.

SUMMARY

In one general aspect, an image processing apparatus includes an image acquiring unit to acquire a first image including color information and a second image having a spectral band wider than that of the first image and a noise reduction unit to extract edge information from the second image and to reduce noise of the first image based on the extracted edge information.

The noise reduction unit may be configured to set a noise reduction area of the first image corresponding to a remaining area of the first image that does not correspond to the extracted edge information of the second image and to perform noise reduction on the noise reduction area of the first image.

The noise reduction unit may include an edge information extractor to extract the edge information from the second image and a noise reduction performer to set a noise reduction area of the first image subject to noise reduction based on the extracted edge information of the second image, and to perform the noise reduction on the noise reduction area of the first image.

The noise reduction unit may be configured to emphasize an edge area of the first image to make the edge area of the first image clear after performing the noise reduction on the first image.

The image acquiring unit may acquire the first image by sensing a color wavelength band of an optical signal and may acquire the second image by sensing one of a white signal, a white signal with visible ray, an infrared signal, and complementary color wavelengths of optical signals.

The image acquiring unit may acquire the first image using a color filter transmitting at least one of three primary colors.

The image acquiring unit may create the second image using at least one of a complementary filter to pass complementary wavelength bands among incident optical signals and an all-pass filter to pass whole wavelengths of the incident optical signals.

The image acquiring unit may include a visible-light sensing layer to sense whole wavelengths signals and complementary wavelength bands of signals and an infrared sensing layer to sense infrared-rays disposed under the visible-light sensing layer.

The image acquiring unit may include a visible-light sensing camera to sense a color wavelength band of signals to acquire the first image and a wide-band sensing camera to sense an infrared band of signals and a full-band of visible light selectively to acquire the second image.

The noise reduction unit may perform low-pass filtering on the noise reduction area of the first image.

In another general aspect, an image processing method using an image processing apparatus includes acquiring by an image acquiring unit a first image including color information and a second image having a band wider than that of the first image, extracting by a noise reduction unit edge information from the second image, and reducing noise by the noise reduction unit of the first image based on the edge information.

The reducing of noise of the first image may include performing noise reduction on the remaining area of the first image except for an edge area of the first image corresponding to the edge information.

The reducing of the noise of the first image may include setting a noise reduction area of the first image corresponding to a remaining area of the first image that does not correspond to the extracted edge information of the second image and performing noise reduction on the noise reduction area of the first image.

The image processing method may further include emphasizing an edge area of the first image to clarify the edge area, after performing the noise reduction on the first image.

The first image may be sensed from a color wavelength band of optical signals and the second image is sensed from at least one of a white signal, a white signal with infrared ray, an infrared signal, and complementary wavelength bands of optical signals.

Reducing noise by the noise reduction unit of the first image may include setting a noise reduction area of the first image corresponding to a remaining area of the first image that does not correspond to the extracted edge information of the second image and performing low-pass filtering on the noise reduction area of the first image.

Other features and aspects will be apparent from the following description, drawings, and claims.

BRIEF DESCRIPTION OF THE DRAWINGS

FIG. 3 is a diagram illustrating an exemplary filtering unit for use in the image acquiring unit shown in FIG. 2.

FIG. 4 is a diagram illustrating another exemplary filtering unit for ise in the image acquiring unit shown in FIG. 2.

Throughout the drawings and the detailed description, unless otherwise described, the same drawing reference numerals will be understood to refer to the same elements, features, and structures. The relative size and depiction of these elements may be exaggerated for clarity and convenience.

DETAILED DESCRIPTION

The following detailed description is provided to assist the reader in gaining a comprehensive understanding of the media, methods, apparatuses, and systems described herein. Accordingly, various changes, modifications, and equivalents of the media, methods, apparatuses, and systems described herein will be suggested to those of ordinary skill in the art. Also, descriptions of well-known functions and structures may be omitted for increased clarity and conciseness.

Figure 1:
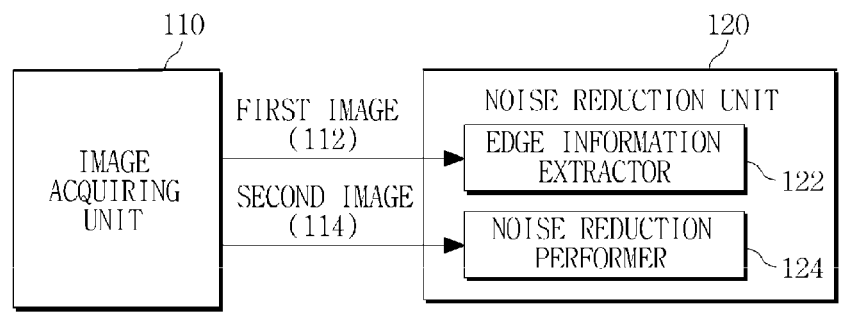
FIG. 1 is a block diagram illustrating an exemplary image processing apparatus.

FIG. 1 illustrates an exemplary image processing apparatus. The image processing apparatus includes an image acquiring unit 110 and a noise reduction unit 120. The image processing apparatus may store images of objects using a solid image sensor, such as a charge coupled device (CCD) and a Complementary Metal Oxide Semiconductor (CMOS). The image processing apparatus may be implemented as, for example, but is not limited to, a digital camera, a digital camcorder, a camera phone, a Personal Digital Assistant (PDA), etc.

The image acquiring unit 110 may include a first image acquiring unit (not shown) to acquire a first image 112 including information regarding colors and a second image acquiring unit (not shown) to acquire a second image 114 including information regarding optical signals having a wavelength band wider than that of the first image 112. The first image 112 may be sensed from optical signals having a color wavelength band of visible light among incident optical signals. The second image 114 may be sensed from white signals, white signals with infrared rays, infrared signals, complementary wavelengths of optical signals, or at least one combination of the optical signals. The second image 114 corresponds to the same scene as that of the first image 112 and may be acquired from various bands of optical signals having better contrast information and more abundant texture information than those of the first image 112. The image acquiring unit 110 will be further described below with reference to FIG. 2.

The first and second image acquiring units also may be implemented independently or integrated into one unit. The image acquiring unit 110 is not limited to the above-described structure and may be implemented as any other structure capable of acquiring a first image including color information and a second image having a wavelength band wider than that of the first image.

The image acquiring unit 110 may include cameras with different light-receiving properties to acquire the first image 112 and the second image 114. In this example, the image acquiring unit 110 includes a visible light sensing camera to sense signals having a color wavelength band to acquire the first image 112 and a wide-band sensing camera to sense signals having a full-band of visible light and an infrared band to acquire the second image 114 selectively.

The noise reduction unit 120 performs noise reduction while conserving the edges and detail components of the acquired images. When strong noise reduction processing is performed on the entire first image 112, including information about colors in order to reduce noise of the first image 112, detail components of the first image may be removed together with the noise, resulting in the generation of a blurred image.

The noise reduction unit 120 of FIG. 1 extracts information regarding edges from the second image 114 and reduces noise of the second image 114 on the basis of the edge information. The noise reduction unit 120 also may perform noise reduction on the remaining part of the first image 112 except for a part corresponding to the edge information.

To perform the noise reduction, the noise reduction unit 120 may include an edge information extractor 122 and a noise reduction unit 124. The edge information extractor 122 extracts edge information from the second image 114. Methods of extracting edge information from images are various. For example, the edge information may be extracted from the second image 114, using one of edge operators, such as a homogeneity operator, difference operator, compass gradient operator, etc. In addition, the edge information may be extracted from the second image 114 using a 2D Mallet wavelet transform function which may be suitable to detect sharp changes in signals. The 2D Mallet wavelet transform function may be used for low bit rate high quality coding of images by wavelet-transforming received images, detecting the locations and sizes of local peaks (edges) from the resultant images, and performing encoding.

The noise reduction unit 124 may reduce noise of the first image 112 on the basis of the edge information. The noise reduction unit 124 may set a noise reduction area of the first image 112, and may perform noise reduction on the first image 112 on the noise reduction area of the first image 112. The noise reduction area may be a predetermined area which is a part of the first image 112 except for its edge area. For example, the noise reduction area may be an area excluding pixels corresponding to the edge lines of the first image 112 and pixels adjacent to the pixels corresponding to the edge lines.

The noise reduction unit 124 may perform noise reduction on the noise reduction area of the first image 112, on the basis of the edge information extracted from the second image 114, using a noise reduction filter (not shown). Upon noise reduction, low-pass filtering may be performed on the noise reduction area of the first image 112, on the basis of the edge information.

After performing the noise reduction on the first image 112, the noise reduction unit 124 may additionally enhance the edge area of the first image 112 in order to make the edge area clear. The noise reduction unit 124 may compensate for the edge area of the first image 112 while reducing the non-continuous characteristics and color fringe defects of the edge area which is enhanced together upon the enhancement of the edge area.

The noise reduction unit 124 may perform noise reduction on an image (e.g., a color image photographed under weak illuminant conditions) having a high-noise color component, using the edge information of a high-luminance image that includes infrared components or that absorbs a wide optical wavelength band, thereby creating a low-noise color image.

Figure 2:
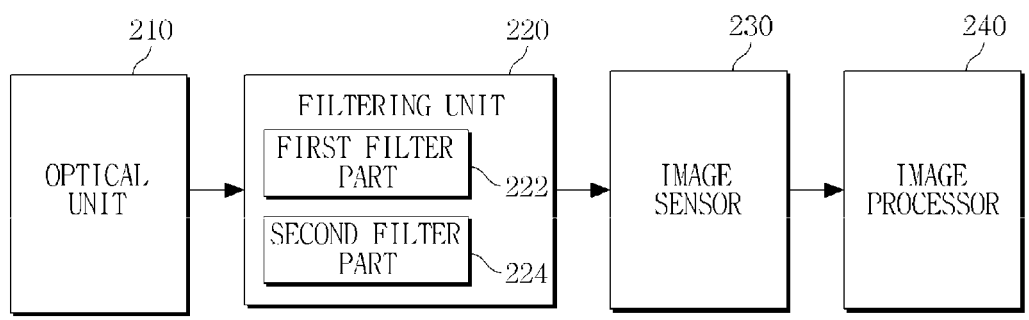
FIG. 2 is a block diagram illustrating an exemplary image acquiring unit included in the image processing apparatus shown in FIG. 1.

FIG. 2 illustrates the exemplary image acquiring unit 110 included in the image processing apparatus shown in FIG. 1. Referring to FIG. 2, the image acquiring unit 110 includes an optical unit 210, a filtering unit 220, an image sensor 230, and an image processor 240.

The optical unit 210 condenses light reflected from an object. The optical unit 210 may include at least one lens, and the number of lens included in the optical unit 210 may depend on the use or purpose of the optical unit 210. The lens may be disposed in various locations on the same plane.

The filtering unit 220 filters an optical signal incident through the optical unit 210 to filter wavelengths belonging to a predetermined wavelength band. Filters included in the filtering unit 220 may be formed in correspondence to pixels.

The filtering unit 220 may include a first filter part 222 to pass a color wavelength band so that the image sensor 230 may sense a first image 112 from among incident optical signals, and a second filter part 224 to pass specific wavelength bands so that the image sensor 230 may sense images belonging to a band wider than that of the first image 112.

The first filter part 222 may be configured to pass predetermined wavelength bands of optical signals condensed by the optical unit 210. For example, the first filter part 222 may be configured to pass optical signals belonging to wavelength bands of Red, Green, and Blue. The second filter part 224 may be configured to pass at least one optical signal from among: white signals: white signals with infrared rays: infrared signals: and complementary wavelengths of incident optical signals.

A complementary color filter for passing complementary wavelengths of optical signals may be one of a Cyan filter, which is a complementary filter of red; a Magenta filter, which is a complementary filter of green; and a Yellow filter, which is a complementary filter of blue. The Cyan filter passes only green and blue wavelength bands from among light condensed by the optical unit 210. The Magenta filter passes only red and blue wavelength bands from among the condensed light, and the Yellow filter passes only red and green wavelength bands from among the condensed light.

The second filter part 224 may be a white filter to pass white signals with infrared rays or a white filter with an infrared (IR) cut-off filter to pass white signals without infrared rays.

The image sensor 230 converts the optical signals that have passed through the filtering unit 220 into electrical signals. The image sensor 230 may convert the optical signals into electronic signals using a sensing layer. The image sensor 230 may include a visible-light sensing layer to convert a visible-light band of optical signals into electrical signals and an infrared sensing layer to convert an infrared band of optical signals into electrical signals thus, the image sensor 230 may sense visible-light signals and infrared signals.

The image sensor 230 may obtain signals of red light ($I_R$), green light ($I_G$), and blue light ($I_B$) from optical signals that have passed through the first filter part 222 of the filtering unit 220. When the second filter part 224 of the filtering unit 220 is a complementary filter, the image sensor 230 may sense complementary bands of signals, and when the second filter part 224 is a white filter, the image sensor 230 may sense a white-light signal $I_W$ from signals that have passed through the full-band of visible light.

When the second filter part 224 is a complementary filter which passes complementary wavelengths of optical signals, the second filter part 224 may extract two color components from a pixel so that images having two-times higher resolution and sensitivity may be obtained than images passing through an RGB Bayer pattern filter. In addition, when the second filter part 224 includes a complementary filter and an all-pass filter, color conversion may be simplified since only a complementary filter and an all-pass filter are used as compared to the case when all signals of red, green, and blue light are used to convert primary color signals into color difference signals Cb, CR, and Y uses. The color difference signal Y may be considered as a white signal $I_W$, Cr may be obtained by subtracting the white signal $I_W$ from the red-light signal $I_R$, and Cb may be obtained by subtracting the white signal $I_W$ from the blue-light signal $I_B$.

The image processor 240, which is included in the image acquiring unit 110, performs image processing before generating noise reduction processing using the first and second image signals. For example, when the filtering unit 220 is configured to simultaneously obtain first and second images, the image processor 240 may interpolate acquired images, thus obtaining first and second images having the same size. When the second filter part 224 includes an all-pass filter (hereinafter, referred to as a "first filter") and a IR cut-off filter (hereinafter, referred to as a "second filter"), the image sensor 230 may acquire only infrared signals by subtracting signals that have passed through the second filter from signals that have passed through the first filter.

FIGS. 3 and 4 further illustrate the exemplary filtering unit 220 included in the image acquiring unit 110 shown in FIG. 2.

As illustrated in FIG. 3, the filtering unit 220 may includes a first filter part, including a Red filter, Green filter, and Blue filter, to pass red (R), green (G), and blue (B) color signals and a second filter part, including a white filter or transparent filter, to pass white (W) signals of a spectral band wider than those of the red, green and blue color signals.

In addition, the filtering unit 220, as illustrated in FIG. 4, may include a first filter part to pass red (R), green (G), and blue (B) color signals and a second filter part including a complementary filter, such as a Magenta filter, to pass signals of a band wider than in the first filter part. The filtering unit 220 also may be configured in various ways in order to obtain a first image including color information and a second image including information more detailed than that of the first image.

Figure 5:
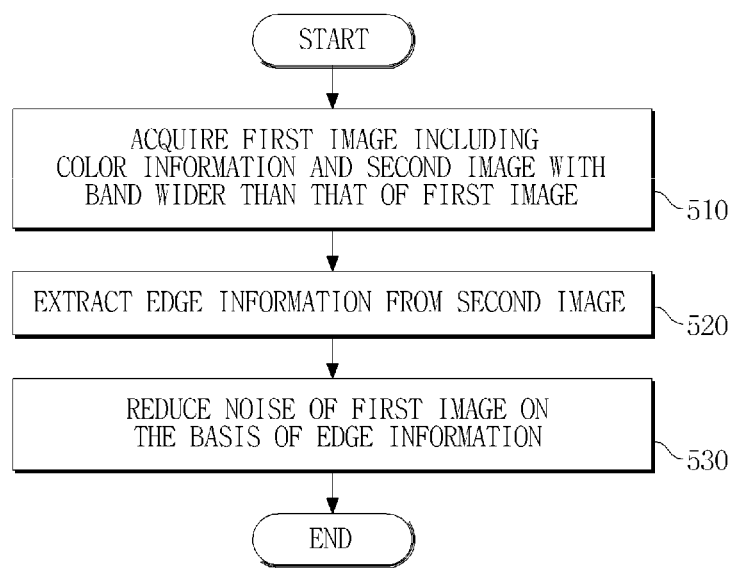
FIG. 5 is a flowchart illustrating an exemplary image processing method.

FIG. 5 illustrates an exemplary image processing method. A first image including color information and a second image having a band wider than the first image may be acquired (510). Edge information may be extracted from the second image (520), and noise of the first image may be reduced on the basis of the edge information (530). The noise reduction may be performed on the remaining part of the first image except for a part of the first image corresponding to the edge information (530).

Reducing the noise of the first image may be performed in the following order (530). For example, edge information may be extracted from the second image. An area, referred to as, "a noise reduction area," of the first image that is to be subjected to noise reduction may be determined as a noise reduction area on the basis of the edge information. Noise reduction processing may be performed on the noise reduction area of the first image. After performing the noise reduction processing of, emphasizing the edge area of the first image may be further performed in order to make the edge area of the first image clear.

The first image may be an image sensed from color-band signals among incident optical signals, and the second image may be an image sensed from white signals, white signals with infrared rays, infrared signals, complementary wavelengths of incident optical signals, or at least one combination of the optical signals. Low-pass filtering may be performed on the noise reduction area of the first image except for the edge area of the first image, on the basis of the edge information (530).

The above-described methods may be recorded, stored, or fixed in one or more computer-readable media that includes program instructions to be implemented by a computer to cause a processor to execute or perform the program instructions. The media also may include, independently or in combination with the program, instructions, data files, data structures, and the like. Examples of computer-readable media may include magnetic media, such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and/or methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus comprising:
    an image acquiring unit to acquire a first image including color information and a second image having a spectral band wider than that of the first image; and
    a noise reduction unit to extract edge information from the second image and to reduce noise of the first image based on the extracted edge information, wherein
    the noise reduction unit sets a noise reduction area of the first image corresponding to a remaining area of the first image that does not correspond to the extracted edge information of the second image and performs noise reduction on the noise reduction area of the first image.

2. The image processing apparatus of claim 1, wherein the noise reduction unit comprises:
    an edge information extractor to extract the edge information from the second image; and
    a noise reduction performer to set the noise reduction area of the first image subject to noise reduction based on the extracted edge information of the second image, and to perform the noise reduction on the noise reduction area of the first image.

3. The image processing apparatus of claim 1, wherein the noise reduction unit is configured to emphasize an edge area of the first image to make the edge area of the first image clear after performing the noise reduction on the first image.

4. The image processing apparatus of claim 1, wherein the image acquiring unit acquires the first image by sensing a color wavelength band of an optical signal and acquires the second image by sensing one of a white signal, a white signal with visible ray, an infrared signal, and complementary color wavelengths of optical signals.

5. The image processing apparatus of claim 1, wherein the image acquiring unit acquires the first image using a color filter transmitting at least one of three primary colors.

6. The image processing apparatus of claim 1, wherein the image acquiring unit creates the second image using at least one of a complementary filter to pass complementary wavelength bands among incident optical signals and an all-pass filter to pass whole wavelengths of the incident optical signals.

7. The image processing apparatus of claim 1, wherein the image acquiring unit comprises a visible-light sensing layer to sense whole wavelengths signals and complementary wavelength bands of signals and an infrared sensing layer to sense infrared-rays disposed under the visible-light sensing layer.

8. The image processing apparatus of claim 1, wherein the image acquiring unit comprises a visible-light sensing camera to sense a color wavelength band of signals to acquire the first image and a wide-band sensing camera to sense an infrared band of signals and a full-band of visible light selectively to acquire the second image.

9. The image processing apparatus of claim 1, wherein the noise reduction unit performs low-pass filtering on the noise reduction area of the first image.

10. An image processing method using an image processing apparatus, the method comprising:
    acquiring, by an image acquiring unit, a first image including color information and a second image having a spectral band wider than that of the first image;
    extracting by a noise reduction unit edge information from the second image; and
    reducing noise, with the noise reduction unit, of the first image based on the edge information, wherein
    the reducing of the noise of the first image comprises setting a noise reduction area of the first image corresponding to a remaining area of the first image that does not correspond to the extracted edge information of the second image and performing noise reduction on the noise reduction area of the first image.

11. The image processing method of claim 10, further comprising emphasizing an edge area of the first image to clarify the edge area, after performing the noise reduction on the first image.

12. The image processing method of claim 10, wherein the first image is sensed from a color wavelength band of optical signals, and
    the second image is sensed from at least one of a white signal, a white signal with infrared ray, an infrared signal, and complementary wavelength bands of optical signals.

13. The image processing method of claim 10, wherein reducing noise by the noise reduction unit of the first image further comprises performing low-pass filtering on the noise reduction area of the first image.

* * * * *